Dec. 28, 1926.
F. D. BARNES
DISPLAY DEVICE
Original Filed Feb. 23, 1926    4 Sheets-Sheet 1
1,612,692
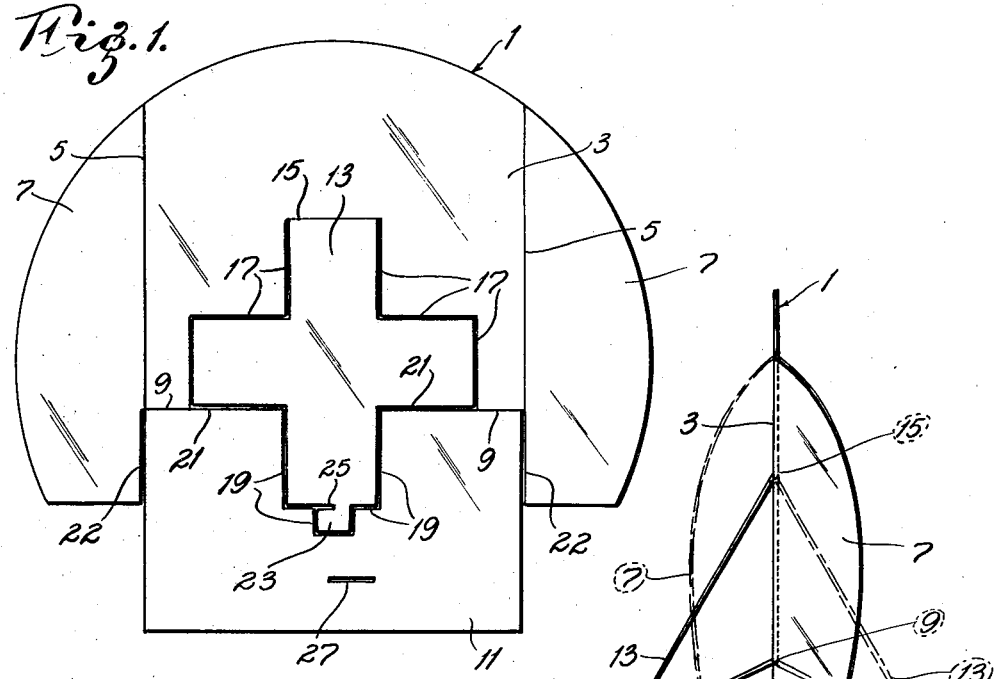
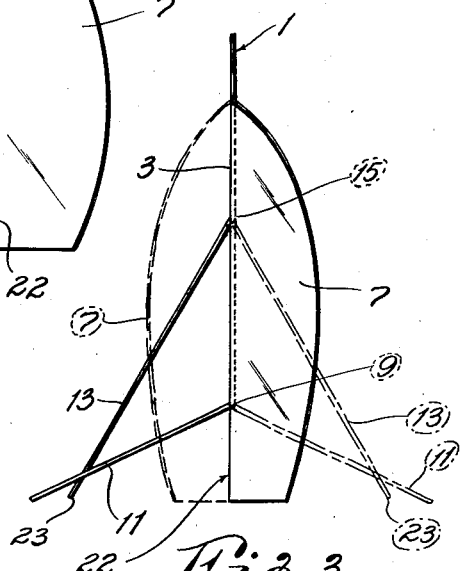
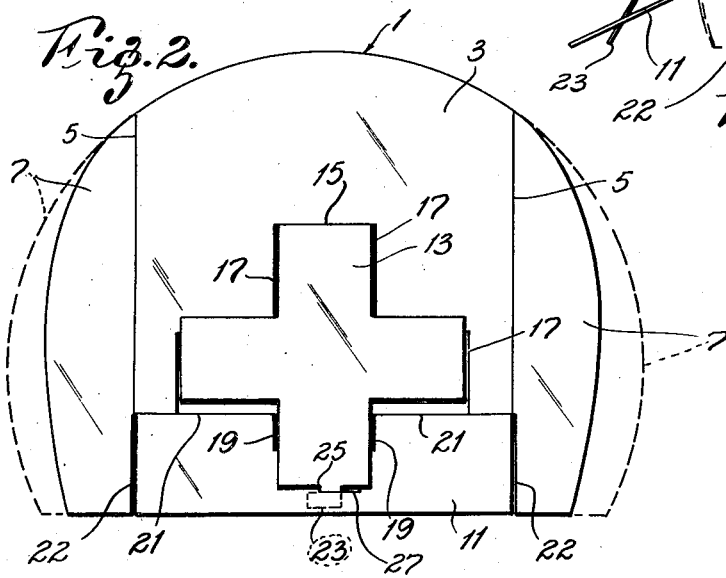
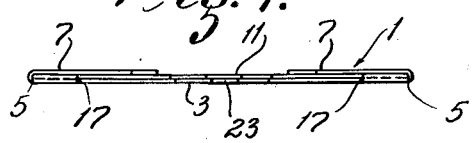

Dec. 28, 1926.
F. D. BARNES
DISPLAY DEVICE
Original Filed Feb. 23, 1926  4 Sheets-Sheet 2
1,612,692
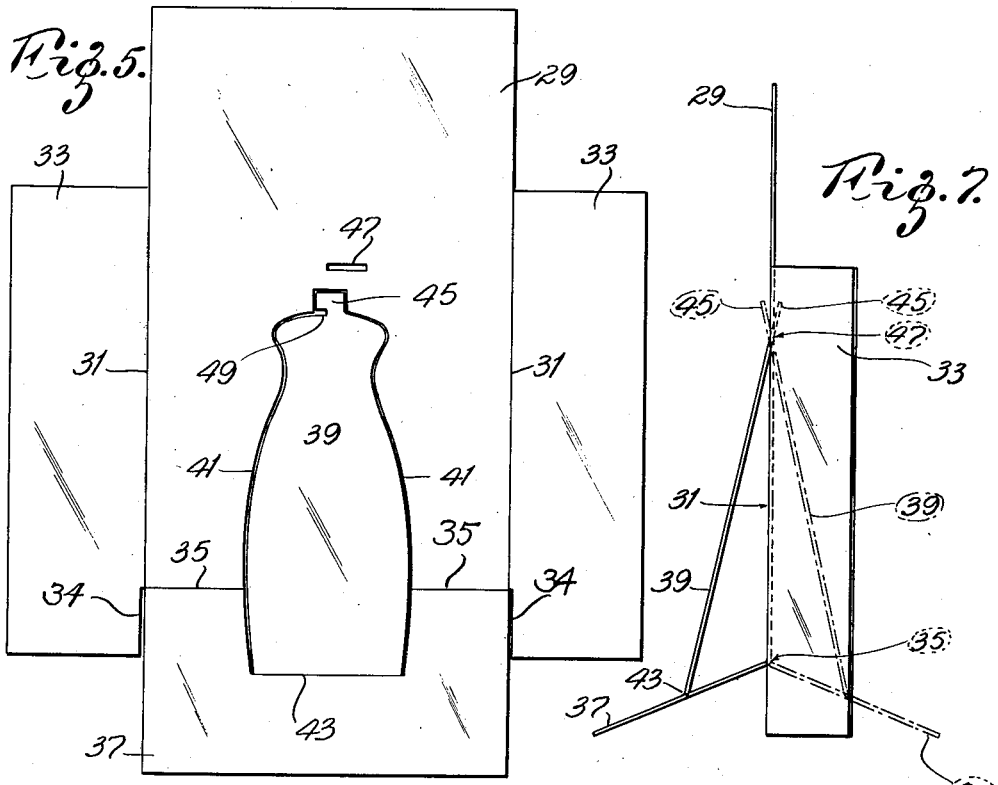
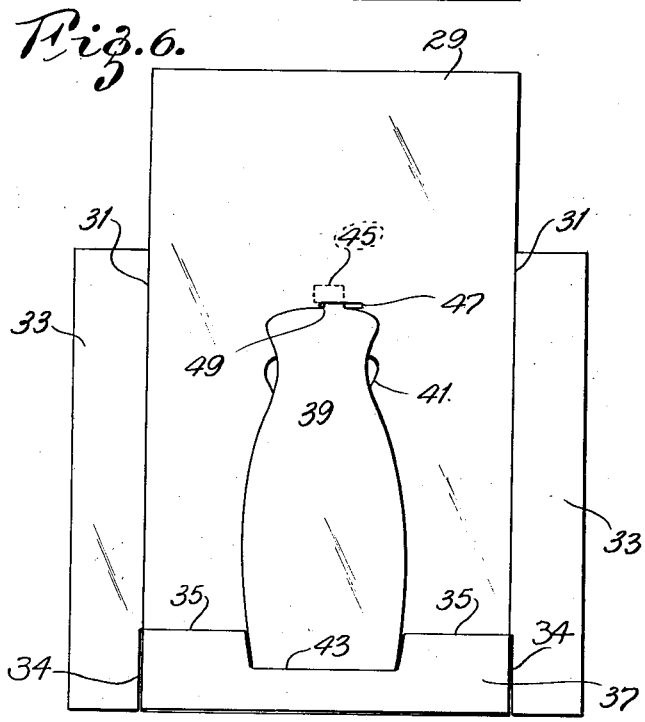
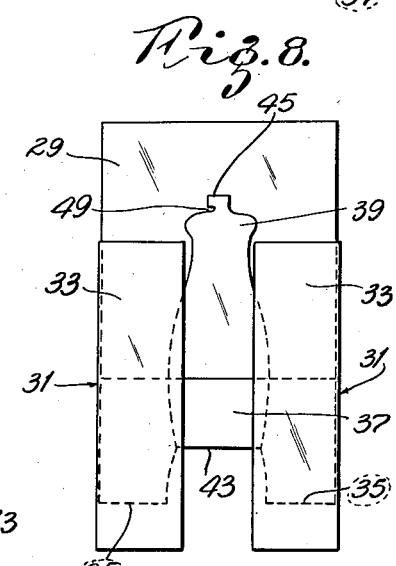

Dec. 28, 1926.　　　　　　　　　　　　　　　　　　　　1,612,692
F. D. BARNES
DISPLAY DEVICE
Original Filed Feb. 23, 1926　　4 Sheets-Sheet 3
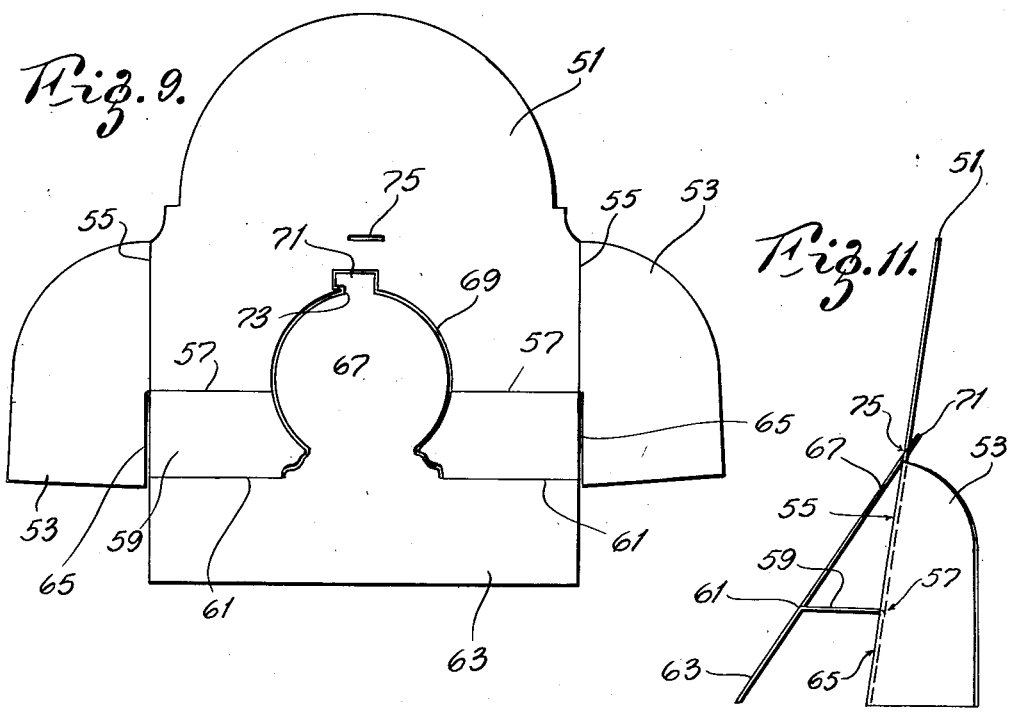
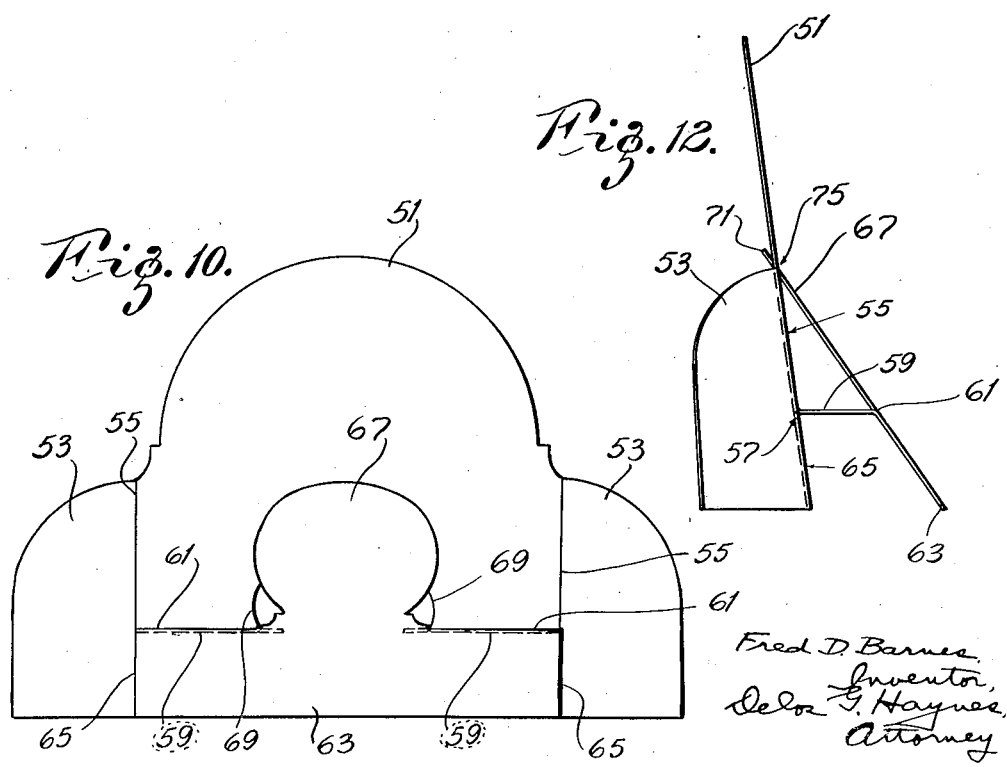

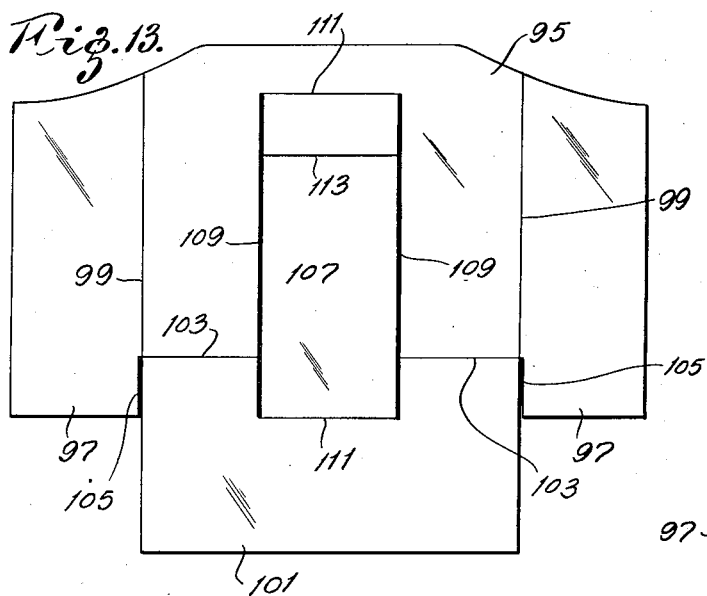
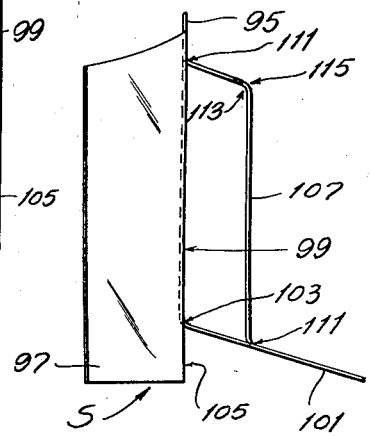
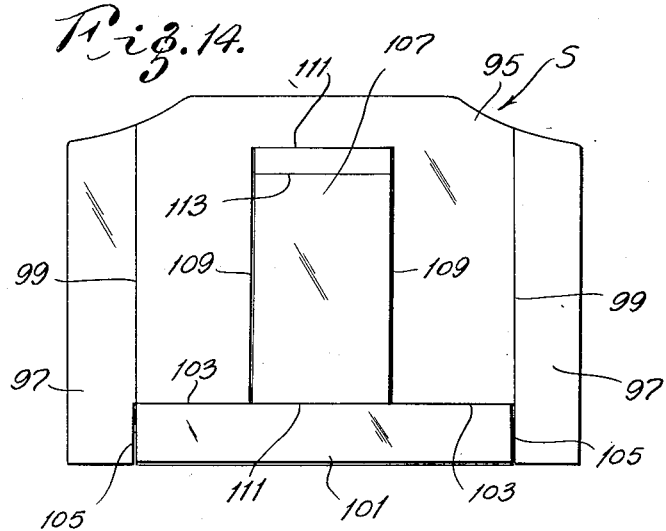
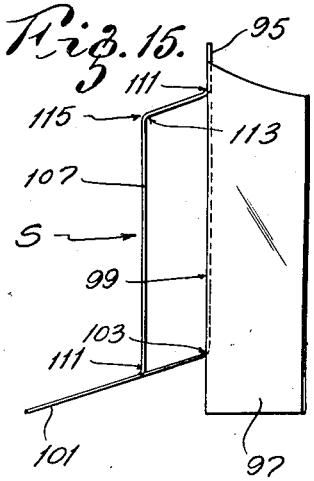
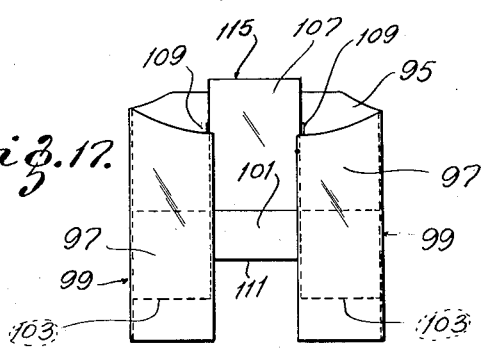

Patented Dec. 28, 1926.

1,612,692

UNITED STATES PATENT OFFICE.

FRED D. BARNES, OF CHICAGO, ILLINOIS, ASSIGNOR TO L. R. CONWELL, OF JACKSON HEIGHTS, NEW YORK.

DISPLAY DEVICE.

Original application filed February 23, 1926, Serial No. 89,857. Divided and this application filed April 26, 1926. Serial No. 104,568.

This invention relates to advertising devices, and with regard to certain more specific features, to a representation of an object or the like, and a display support therefor. The invention comprises a continuation in part of the invention set forth in my copending application, Serial Number 89,857, filed February 23, 1926.

Among the several objects of the present invention may be noted the provision of a simple and inexpensive device for displaying in perspective a representation of an object or the like, together with suitable legends; the provision of a strikingly attractive device of this type which can be made from a single blank and shipped flat; the provision of a device of the class described which is adapted to positively retain itself in proper angular relationship of parts so that it may be relied upon not to change its shape after a mounting thereof, said mounting not requiring a fine degree of manipulation in order to produce a highly successful resultant display; and the provision of a device of the class described adapted to be effectively displayed in either of two positions thereof, whereby alternate displays may be had without employing two devices or altering the number of display elements. Other objects will be in part obvious and in part pointed out hereinafter.

The invention accordingly comprises the features of construction, combinations of elements and arrangements of parts, which are exemplified in the description hereinafter in connection with the accompanying drawings, and the scope of the application of which will be indicated in the following claims.

In the accompanying drawings, in which are illustrated several of various possible embodiments of the invention, Fig. 1 is a face view of a preferred form of the device, shown flat;

Fig. 2 is a front elevation of the preferred form shown in mounted or assembled position for display, and showing in dotted lines certain alternate wing positions;

Fig. 3 is a side elevation of Fig. 2, and shows in dashed lines, certain alternate panel and wing positions;

Fig. 4 is an end elevation of the device folded flat for shipping purposes;

Fig. 5 is a view similar to Fig. 1 showing a modified form of the device;

Fig. 6 is a view similar to Fig. 2 and shows said modified form;

Fig. 7 is a view similar to Fig. 3 and shows the modified form with the said alternate panel positions;

Fig. 8 is a plan view of said modified form shown folded flat for shipping;

Fig. 9 is a view similar to Fig. 1 and shows a second modified form of the device;

Fig. 10 is a view similar to Fig. 2 and shows the second modified form of the device without alternate positions;

Fig. 11 is a view similar to Fig. 3 and shows the second modified form of the device without alternate positions;

Fig. 12 is a view similar to Fig. 11, but shows an assembly reversed from that shown in Fig. 11;

Fig. 13 is a view similar to Fig. 1, showing a third modification of the device;

Fig. 14 is a view similar to Fig. 2, showing said third modified form without alternate positions;

Fig. 15 is a view similar to Fig. 3, showing said third modified form without alternate positions;

Fig. 16 is a view similar to Fig. 15, but shows an assembly reversed from that shown in Fig. 15; and Fig. 17 is a view similar to Fig. 8, showing said third modified form in folded shipping position.

Similar reference characters indicate corresponding parts throughout the several views of the drawings.

Referring now more particularly to Figs. 1 to 4, there is illustrated at 1 a blank formed of a single sheet of suitable material such as patent coated solid manilla or the like. For a size such as will include about eight hundred square inches of material in substantially a square piece, a thickness of twenty-five points is suitable.

The device may take a variety of forms. In Figs. 1 to 4 the middle portion 3 may carry suitable legends and the like (not shown) and may have various suitable shapes. Formed sidewardly of the central portion 3 are score lines 5 which serve as hinges for sideward wings or panels 7. The panels 7 also serve display purposes and may or may not carry legends and the like. The legends, illustrations and the like may be formed both on the front and back of any panel referred to herein. The front and back legends may differ in color, form or subject-matter. They may be printed on ledger or like paper which may be attached to both sides of the panels. Joined to said central portion or panel 3 by means of preferably aligned score lines 9 is a lower panel 11. A more or less central display portion 13 is cut partially from the lower panel 11, and is hinged to said central panel 3 by an enclosing score line 15. The gashes which separate the display panel 13 from the central background panel 3 are indicated by the numeral 17 in the drawings. The gashes which separate the said portion 13 from the lower panel 11 are indicated at numeral 19. Two gashes 21 form continuations of the score lines 9 and also aid in relieving the portion 13 from the portions 3 and 11.

It is evident from the foregoing that the display panel 13 is practically hinged to the central portion 3 at the score line 15 and is free to swing about said score line as a center. Likewise, the lower panel 11 is free to hingedly swing on the portion 3 with the score lines 9 acting as hinges, that is, if relieving gashes 22 are cut between the panel 11 and the side wings 7. The score lines 9 and 15 are adapted to permit the panels 11 and 13 to swing rearwardly or forwardly.

In die-cutting the display panel 13, there may be provided at its bottom edge a tongue 23 into one side of which there is formed a notch 25. The tongue 23 is of material which was primarily in the lower panel 11, which thus acts as a bracing panel, as hereinafter described.

In the panel 11, below the portion from which said tongue 23 is cut, is formed a slot 27 adapted to receive said tongue 23 but offset laterally from the normal position of said tongue 23. The offset for the slot 27 is of such an amount as to disalign said slot with regard to the notch 25.

In making the device only two operations are required, namely, lithographing or the equivalent and die-cutting or the equivalent. In setting it up for display purposes, the only operations necessary are to press the display panel 13 and the panel 11, say forwardly, slip the tongue 23 into the slot 27 as far as it will go, and then release the tongue 23. The normal tendency of tongue 23 will be to spring back into its normal lateral position, whereby the notch 25 will be caused to engage the left end of the slot 27. Hence a predetermined angular relationship between the portions 3, 11 and 13 is permanently retained until it is desired to again flatten the device. It is to be understood that the notch 25 may be omitted and the tongue merely slipped into the slot without an offset relationship existing. Furthermore the lower end of the panel 13 might merely rest on the panel 11, the side wings bracing the device. Similar modifications may be made in the forms to be described hereinafter. The exact and particular relationship attained depends upon the distance that the slot 27 is formed below the tongue or ear 23 and the relative lengths of the respective panels. The above described operation brings the display panel 13 forwardly and into respective relationship with regard to the background portion 3. Said display panel 13 is also brought into perspective relationship with regard to the bracing panel 11, said panel 11 being itself in perspective relationship to the portion 3. Hence a person viewing the display from a slightly elevated position is given a striking illusion of depth as regards the display panel 13. The sideward wings 7 may be hinged rearwardly as shown in Figs. 2 and 3, or hinged slightly forwardly or, if desired, may be left in the plane of the portion 3, depending upon the fancy of the user. The dotted lines in Fig. 2 show the effect produced when the wings are aligned with the portion 3. It is to be understood that the wings may have other standards substituted therefor for holding up the portion 3 when the bracing panel is in position.

Part of the support, namely, the bracing panel 11, rests upon the floor or show-case or the like, as well as does the background panel 3. This fact, coupled with the fact that the device is made of one piece, with a positive interlock between the tongue 23 and slot 27, insures a stability and rigidity necessary for display purposes, when substantially thinner material is used than is ordinarily used for devices of similar size. It will be noted from Fig. 3 that the panels 3, 11 and 13 form a triangle in projection. Triangle bracing structures are kinematically rigid but not redundant with regard to their bracing qualities. The structure shown in Figs. 1 to 3 illustrates (as an example of a display panel 13) a cross shape. The particular shape that the panel may assume is left to the discretion of the designer of the device, and does not change the principles of construction herein set forth.

As hereinbefore indicated, the lithographing or the like on the fronts and backs of the panels may be of different kinds. Therefore, if the panels 11 and 13 are unfastened at the tongues-and-slot combination 23, 27, swung rearwardly and then re-fastened at the said tongue and slot 23, 27, there will result an analogous display as regards an advantageous shape, but fresh and new advertising matter illustrations and the like are presented (see alternate positions, Fig. 3). Hence an invariable trade-mark or the like may be displayed in an advantageous manner with varying illustrations and the like. For instance, the cross-shaped mark illustrated in Figs. 1 to 3 might be presented at the front with winter scenes and material portrayed on the front of the panels, and later as the season advanced, presented rearwardly (the device turned about) with spring scenes and material. It is to be understood that the side wings 7 may be re-positioned, if desired, when the panels 11 and 13 are re-positioned. The present form of display provides in one simple foldable piece, display material adapted to provide advertising matter which will be effective for a greater period of time than was heretofore possible.

Fig. 4 shows the preferred form of the device folded for shipping. In folding for shipping the sideward wings 7 are merely folded over, either on the face or back of the device. Hence a small and compact shipping package may be formed therefrom. If desired, the panel 11 may be folded up on the portion 3, in under the wings 7.

In Figs. 5 to 8 is illustrated the second form of the device. These figures show two things, namely, how the central display panel may be varied in shape (as well as the other panels) and how the interlocking tongue-and-groove combination may be applied at the top of the display panel instead of the bottom thereof.

In the said modified form there is provided a central background portion 29 corresponding to the said portion 3 of the preferred form. Hinged sidewardly to the portion 29 by means of score lines 31 are sideward wings 33. Hinged to the central portion 29 at the bottom thereof and by means of score lines 35 is a bracing panel 37 corresponding to the said panel 11. The panel 37 is relieved from the sideward wings 33 by means of gashes 34. A central display panel 39 is die-cut partially from the background panel 29 and partially from the bracing panel 37. The gash 41 illustrates the manner in which the display panel 39 is relieved from the panels 29 and 37. The display panel 39 is hinged to the lower bracing panel 37 by means of a score line 43 formed therebetween.

At the upper extremity of the central display panel 39 is formed a tongue 45, which in the die-cutting operation, has been taken from the material of the central portion 29. The portion 29 has a slot 47 cut therein at some distance above the tongue 45 on the panel 39. The slot 47 is laterally offset to the right from the normal position of the tongue 45. A notch 49 is cut into the left side of the tongue 45.

In order to set the modified device up for display it is again only necessary to press the panels 39 and 37 forwardly, or rearwardly, slip the tongue 45 in the notch 47 as far as it will go, and release the tongue. The tongue will then have a tendency to assume its normal lateral position, whereby the notch 49 therein cooperates with the left end of the notch or slot 47 to provide a permanent interlocking engagement between said members 39 and 29.

Figs. 6 and 7 illustrate the result attained with the modified form, which corresponds to the result attained with the preferred form, except that the display interlock is formed between the display panel and the background panel, instead of between the display panel and the bracing panel as was the case in the preferred form. Moreover the hinge for the display panel is at the bracing panel in the second form, whereas it was at the background portion 3 in the preferred form. The same advantages accrue to the second form that were had with the first form. The wings 33 may be folded rearwardly, forwardly or may be kept in line with the portion 29. Different matter may be printed on the front and rear of the respective panels.

In order to fold the device for shipping (Fig. 8) the display panel 39 is un-notched and drawn upwardly on the portion 29 thereby folding the bracing panel 37 upwardly on the score lines 35 against the said portion 29 and the display portion 39. The sideward wings 33 are then folded over on the front of the device, whereupon a small and compact shipping package may be formed therefrom.

In Figs. 9 to 12 is shown a second modified form. In this case there is formed a central background panel 51 having sideward wings 53 formed therewith along score lines 55. Hinged downwardly to the central portion 51, by means of score lines 57 is an intermediate shelf panel 59. This panel 59 has downwardly hinged thereto, by means of score lines 61, a bracing panel 63. The panels 59 and 63 are relieved from the sideward wings 53 by means of gashes 65.

Formed with and in the plane of the bracing panel 63 is a central display panel 67, which in the manufacturing of the device, is die-cut from the material of the portions 51 and 59 by means of a gash 69. The gash 69 is of any shape such as may suit a designer's fancy and the score lines 57 and 61 are adapted to reach to said gash 69. The display panel 67 is again provided at its upper edge with a tongue 71 having a notch 73 cut on one side thereof. This tongue 71 is adapted to cooperate with an offset slot 75, which is cut into the portion 51 to some distance above the tongue 71. It may be seen that the panels 59 and 61 cooperate to form a bracing member similar to the bracing member or panel shown on each of the other forms illustrated herein.

To set this device up for display purposes it is again only necessary to push the display panel forwardly or rearwardly and to engage the tongue 71 with the slot 75. The result illustrated in Figs. 10, 11 and 12 is thus attained, wherein the display panel 67 is aligned with the bracing panel 63, is set angularly with regard to the central portion 51, and the shelf panel 59 forms a more or less horizontal shelf upon which objects may be mounted for display, if desired. This described modification has all the advantages of the previous forms accruing thereto, and has a further advantage that one more display plane and support is provided upon which objects may be rested. It is advantageous from an advertising standpoint to have an actual object displayed; about which object display are grouped enticing illustrations and advertising matter with regard thereto. The form shown in Figs. 9 to 12, like the previous form, requires only die-cutting and lithographing operations for the manufacture thereof. It is formed of a single piece of material. Different illustrations and the like may be printed on the front and rear thereof.

Fig. 11 shows a forward positioning of the panels 59, 63 and 67, while Fig. 12 shows a rearward positioning thereof. The device may be readily folded flat for shipping by laying the wings 53 against the central group of panels.

In Figs. 13 to 17 is illustrated the last modified form of the device in which no interlocking tongue-and-groove combination is employed. In this case, a central background panel 95 is employed, to which is hinged a pair of sideward display wings 97. These wings 97 are hinged by means of score lines 99. To the bottom of the portion 95 is hinged a bracing panel 101. Score lines 103 form a hinge for said panel 101 and gashes 105 relieve it from the sideward wings 97, whereby it can swing from said portion 95. A central display panel 107 is relieved from the material of the panels 95 and 101 by means of gashes 109. The gashes 109 are met by the said score lines 103. At the top and bottom ends of said gashes 109 are formed joining score lines 111. Between said score lines 111 and joining said gashes 109 is another score line 113 cut at a predetermined position. The score line 113 serves the purpose of permitting a point of collapse 115 along the panel 107, that is, when the bracing panel 101 is hinged upwardly. By this means a secondary panel 113 is formed at the top of the panel 107 and at an angle with regard thereto.

The device is set up for display purposes merely by grasping the bracing panel 101 and hinging it upwardly either forwardly or rearwardly, whereupon the score lines 111 and 113 act as hinges to permit the positioning of parts illustrated in Figs. 15 or 16. The operation may be aided by properly pressing the panel 107 forwardly or rearwardly respectively. The wings 97 may be bent rearwardly, forwardly, or may be left in line with the portion 95. The net result is a box-like structure S set in perspective with regard to the portions 95 and 101 either forwardly or rearwardly. This structure has more or less the appearance of a package such as is ordinarily used in the sale of certain commodities. If it is desired to have the front face 107 parallel with the portions 95, then the distance between the score line 113 and the upper score line 111 should be equal to the distance between the lower score line 111 and the score lines 103. A parallelogram is thus formed in side elevation. The appearance of an ordinary package is thus approximated. The proportions of parts may however be so varied that the appearance of any special shape of package may be approximated or exactly duplicated. It is to be understood that this last-named form may also be provided with different kinds of advertising markings at the front and rear thereof.

In Fig. 17 is illustrated the shipping form for the third modified structure. The panel 101 is folded upwardly against the portion 95 and takes the display panel 107 with it. Portion 117 then lies flat against the portion 95 and beneath the panel 107. After this the wings 97 are folded over on to the panel 95 whereby the device is ready for being wrapped in a neat and compact package. The panels 95, 101 and 107 may be left flat for shipping and only the wings 97 folded, if desired.

The articles of all types herein illustrated may be shipped flat, and may be readily folded into shape, for use by comparatively unskilled labor. All score lines thereon are adapted to provide reversible hinging. It is to be understood that a plurality of display panels or plurality of combinations of any of the panels described may be employed in a single device without departing from the essence of the invention.

From the above it will be seen that the several objects of the invention are attained and other advantageous results attained.

As many modifications of the embodiments above illustrated might be made without departing from the spirit or scope of the present invention, it is intended that the above description and accompanying drawings and claims shall be interpreted as illustrative and not in a limiting sense.

I claim:

1. An advertising device comprising a background portion, a bracing panel hinged downwardly thereto, a display panel cut from the said portion and the bracing panel and hinged to the said background portion, means for interlocking the display panel with the bracing panel, and sidewardly hinged wings formed with the said background portion.

2. An advertising device comprising a background portion, a bracing panel hinged downwardly thereto, a display panel cut from the said portion and the bracing panel and hinged to the said background portion, and means for interlocking the display panel with the bracing panel when the bracing panel is angularly arranged with respect to the background portion.

3. A one-piece advertising device comprising a substantially vertical background panel, a brace panel hinged thereto at a downward point by means of score lines and also a display panel, said display panel being formed of material from said background and brace panels, means for interlocking the display and brace panels whereby the brace panel is held in bracing position and the display panel in perspective relationship to the said two panels.

4. An advertising device comprising a background portion, a bracing panel hinged thereto, a display panel formed in part from the background portion and in part from the bracing panel and connected at its ends to said portion and panel respectively, and sideward wings formed with the said background portion.

5. An advertising device comprising a background portion, a bracing panel hinged downwardly thereto, a display panel cut from the said portion and the bracing panel and hinged to the said background portion, means for interlocking the display panel with the bracing panel in a cooperating position on either side of the background portion and advertising display space on the front and rear of the background portion and said panels.

6. An advertising device comprising a background portion, a bracing member connected therewith to swing backward or forward to take up a bracing position, a display panel adapted to stand in perspective relationship with respect to and to cooperate with the background portion and the bracing member either forwardly or rearwardly, said display panel being cut from the plane of the background portion and the bracing member but fastened to at least one of them, whereby it automatically takes up a position in a plane with said background portion and said bracing member when the device is laid flat.

7. An advertising device comprising a background portion, a panel integrally formed to swing at the lower end of said background portion and adapted to extend forwardly and downwardly from the background portion and adapted to have its lower edge rest upon the surface that supports the background portion when the device is in display position, and a display panel formed in part from said background portion and in part from said first named panel and engaging at its ends said portion and first named panel to hold the three parts in predetermined relation.

8. An advertising device comprising a background portion, sideward wings thereon adapted to support said portion, whose lower edges are at a lower elevation than the lower edge of the background portion, a panel integrally formed to swing at the lower end of said background portion and adapted to extend forwardly and downwardly from the background portion and adapted to have its lower edge rest upon the surface which supports the lower edge of said wings when the device is in display position, and a display panel formed in part from the background portion and in part from said first named panel and engaging at its ends said portion and first named panel to hold the three parts in predetermined relation.

In testimony whereof, I have signed my name to this specification this 22nd day of April, 1926.

FRED D. BARNES.

CERTIFICATE OF CORRECTION.

Patent No. 1,612,692, granted December 28, 1926.

to FRED D. BARNES,

It is hereby certified that error appears in the above mentioned patent requiring correction as follows: In the drawings Sheets 1 to 4, in headings, date of filing application, for Feb. 23, 1926 read April 26, 1926; In the heading to the printed specification, date of filing application, strike out lines 6 and 7 and insert instead, Continuation in part of application Serial No. 89,857, filed February 23, 1926. This application filed April 26, 1926, Serial No. 104,568; and that the said Letters Patent should be read with these corrections therein that the same may conform to the record of the case in the Patent Office. Signed and sealed this 8th day of February, A. D. 1927.

Seal.

William A. Kinnan,
Acting Commissioner of Patents.